No. 676,133. Patented June 11, 1901.
W. E. HILL.
REIN HOLDER.
(Application filed Feb. 26, 1901.)
(No Model.)
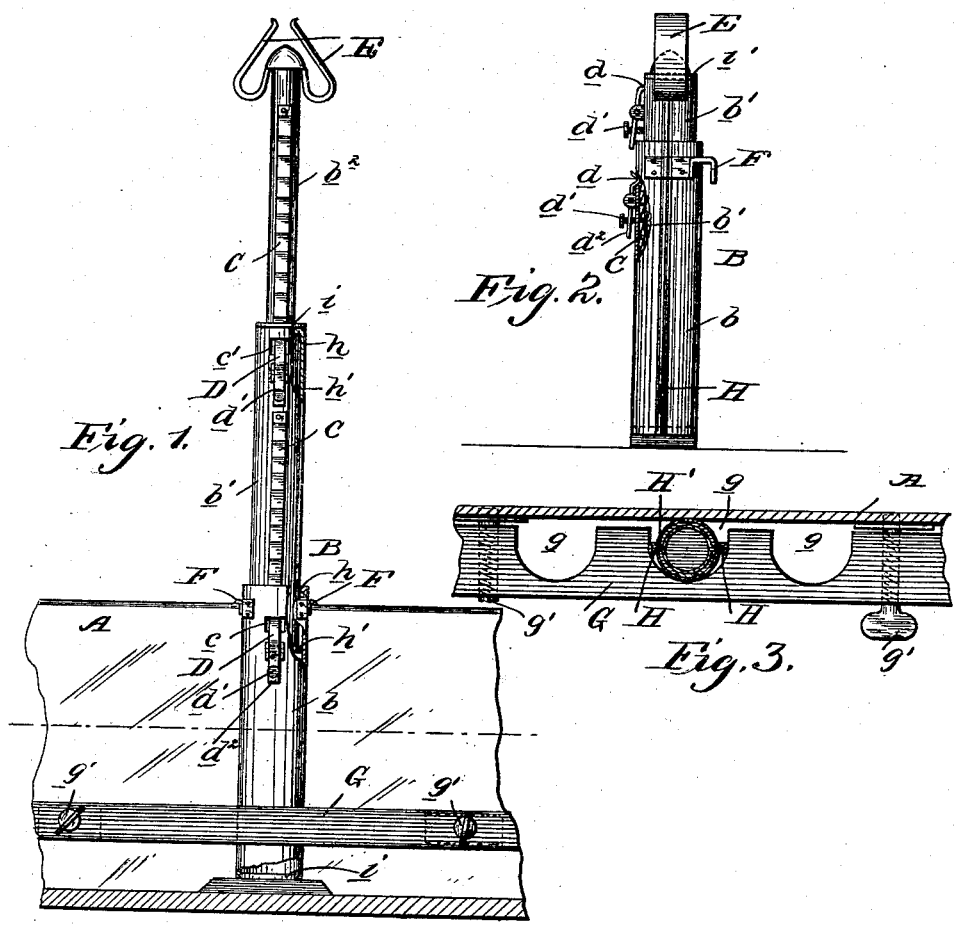
WITNESSES:
INVENTOR:
W. E. Hill
BY
ATTORNEY

UNITED STATES PATENT OFFICE.

WILLIAM E. HILL, OF EVANT, TEXAS.

REIN-HOLDER.

SPECIFICATION forming part of Letters Patent No. 676,133, dated June 11, 1901.

Application filed February 26, 1901. Serial No. 48,891. (No model.)

*To all whom it may concern:*

Be it known that I, WILLIAM E. HILL, a citizen of the United States, residing at Evant, in the county of Coryell and State of Texas, have invented certain new and useful Improvements Rein-Holders; and I do hereby declare the following to be a full, clear, and exact description of the invention, such as will enable others skilled in the art to which it appertains to make and use the same.

This invention relates to an improvement in rein-supports, and more particularly to that style of support designed to be attached to the forward part of a buggy or vehicle adjacent the dashboard thereof.

The invention has for its primary object the provision of a support which may be adjusted to different elevations or may be totally collapsed for storing when the same is not in use.

Another object of the invention relates to a novel fastening means for retaining the various sections in adjusted positions.

Other improved details will be apparent from the detailed description hereinafter and the appended claims.

In the accompanying drawings an embodiment of the invention is shown for the purposes of illustration, and when referring to the same like letters of reference will refer to corresponding parts in the several views.

Figure 1 is an elevation of the holder in its extended or operative position adjacent the dashboard of a vehicle. Fig. 2 is an elevation of the device in collapsed or stored position, and Fig. 3 is a sectional view on the line X X of Fig. 1.

Referring more specifically to the drawings, A designates the ordinary dashboard of a buggy or other vehicle, and B the holder secured to the same. The holder is composed of the three tubular telescopic sections $b\ b'\ b^2$, each of these sections from the bottom to the top gradually decreasing in diameter, so as to be capable of sliding the one within the other, as will be readily apparent. The collapsed or stored position of the holder is shown in Fig. 2 and the extended or operative position in Fig. 1. That the sections may be suitably locked in extended position and may be capable of various adjustments I provide on the exterior surface of each of the same an elongated toothed strip C. These strips extend longitudinally of the respective sections and are secured thereto by rivets or otherwise. Near the upper ends of the sections $b\ b'$ suitable openings $c\ c'$ are provided, through which are adapted to work the engaging portions $d$ of pawls D, said engaging portions in operative positions projecting beneath the teeth of the racks in an obvious manner. The pawls are in turn locked in position by the screw-threaded adjusting-bolts $d'$ passing through the extended portions $d^2$ thereof and adapted to impinge the surface of the sections. Interlocking tongues H' and grooves H prevent any turning of the sections.

At the extreme upper end of the top section and to the respective sides thereof are the spring-guides E, through each of which one rein is adapted to pass.

To confine the support in position adjacent the dashboard, suitable fingers F are secured near the upper end of the lowermost section, so as to engage the upper edge of the dashboard, as best seen in Fig. 2. The lower portion of this section passes through any one of the suitable recessed portions $g$ of the elongated binding-strip G, extending across the dashboard and held in position upon the same and clamping the lower portion of the section $b$ by the screw-threaded bolts $g'$. Washers $i\ i'$ serve to cushion a section and prevent noise and jar when collapsing the same.

From the above it will be apparent that a simple and efficient holder is provided, which may be readily attached and detached when desired and which when not in use may be collapsed into the least possible space.

Having thus described the invention, what is claimed as new, and desired to be secured by Letters Patent, is—

1. A rein-holder comprising a suitable standard, means for adjusting the same vertically, and means for securing the same to a dashboard comprising fingers on the standard adapted to engage over the upper edge of the dashboard, a recessed binding-strip extending across the standard and dashboard, and means engaging the opposite ends of said strip to bind the same to the dashboard, substantially as described.

2. A rein-holder comprising a series of tubular telescopic sections, guides at the upper end of the upper section and means for adjusting the various sections vertically comprising toothed racks on the exterior surfaces thereof, pawls on some of the sections adapted to engage the teeth of the racks on the adjacent sections and means for retaining the pawls in adjusted positions, substantially as described.

3. A rein-holder comprising a series of tubular telescopic sections, guides at the upper end of one of the sections, means on the lower section for attachment to a dashboard, interlocking beads and grooves on the various sections, to prevent the turning thereof, and cushioning means arranged at the contacting points of the sections, substantially as described.

In testimony whereof I affix my signature in presence of two witnesses.

WILLIAM E. HILL.

Witnesses:
G. E. TERRY,
J. T. DEMPSTER.